United States Patent [19]

Kontz

[11] Patent Number: 4,496,409
[45] Date of Patent: Jan. 29, 1985

[54] METHODS AND MACHINES FOR PLACING AND HEATING ORIENTED PLASTIC HEAT-SHRINKABLE SLEEVES ON CONTAINERS

[75] Inventor: Robert F. Kontz, Toledo, Ohio
[73] Assignee: Owens-Illinois, Inc., Toledo, Ohio
[21] Appl. No.: 510,482
[22] Filed: Jul. 5, 1983
[51] Int. Cl.³ .............................................. B29C 27/00
[52] U.S. Cl. .................................... 156/85; 156/86; 156/215; 156/294; 156/446; 156/447; 156/458
[58] Field of Search ............... 156/84, 85, 86, 212, 156/215, 446, 447, 448, 456, 457, 458, 294

[56] References Cited

U.S. PATENT DOCUMENTS 3,959,065  5/1976  Ashcroft ........................... 156/458
4,016,706  4/1977  Braker et al. ....................... 156/86
4,033,804  7/1977  Baldyga ............................ 156/84
4,108,709  8/1978  Hoffman .......................... 156/446

Primary Examiner—Jay H. Woo
Assistant Examiner—Timothy W. Heitbrink
Attorney, Agent, or Firm—John R. Nelson; Myron E. Click

[57] ABSTRACT

A machine for placing and heat-shrinking oriented plastic tubular sleeve labels around containers is described. The machine has a turret with means for holding and rotating containers around the turret periphery including rope drive means. There is also provided sealing means for heating and pressing the heated seam of the sleeve, the means including a free floating self-aligning pressing bar.

13 Claims, 13 Drawing Figures

METHODS AND MACHINES FOR PLACING AND HEATING ORIENTED PLASTIC HEAT-SHRINKABLE SLEEVES ON CONTAINERS

The present invention relates to methods and machines for placing heat-shrinkable oriented plastic sleeves around containers and heating the sleeves to heat-shrink the same around the containers.

There has been a need for compact machines and efficient methods for placing oriented plastic tubular sleeves on containers and heat-shrinking the sleeves around the containers on a production basis.

It is an object of the present invention to provide a compact machine and an efficient production method for placing oriented plastic tubular sleeves on containers and heat-shrinking the sleeves around the container rapidly and efficiently with a reduction of energy required and a reduction of labor needed.

It is an object of the present invention to provide a compact machine comprising a turret, the machine being capable of efficiently placing and heat-shrinking oriented plastic sleeves on the containers in less than one revolution of the turret, the machine being easily adjusted to handle containers of various sizes such as ½ liter to 2 liter oriented polyethylene terephthalate carbonated beverage bottles.

It is an object of the present invention to provide a compact machine that is inexpensive to build, operate and maintain, the machine being especially adapted to operate in a small space and to place oriented plastic sleeves around containers and heat-shrink the sleeves around the containers.

It is an object of the present invention to provide a compact, easy to build, inexpensive machine for placing oriented plastic tubular sleeves around containers and heat-shrinking the sleeves on the containers, the machines comprising a turret having an upper portion and a lower portion, there being means for transporting and rotating containers around the periphery of the upper turret preferably by a rope drive that contacts each of the containers in the neck thereof, there being means on the lower turret for forming the sleeves on a mandrel, the forming means including free floating, self-aligning pressing means that presses the newly formed heated seam in the sleeve, there being means on the lower turret for supplying oriented plastic sleeves around each of the containers from the bottom thereof, the sleeve being assembled telescopically with the containers and heat-shrunk therearound.

These and other objects will be apparent from the specification that follows, the appended claims, and the drawings in which:

Figure 1:
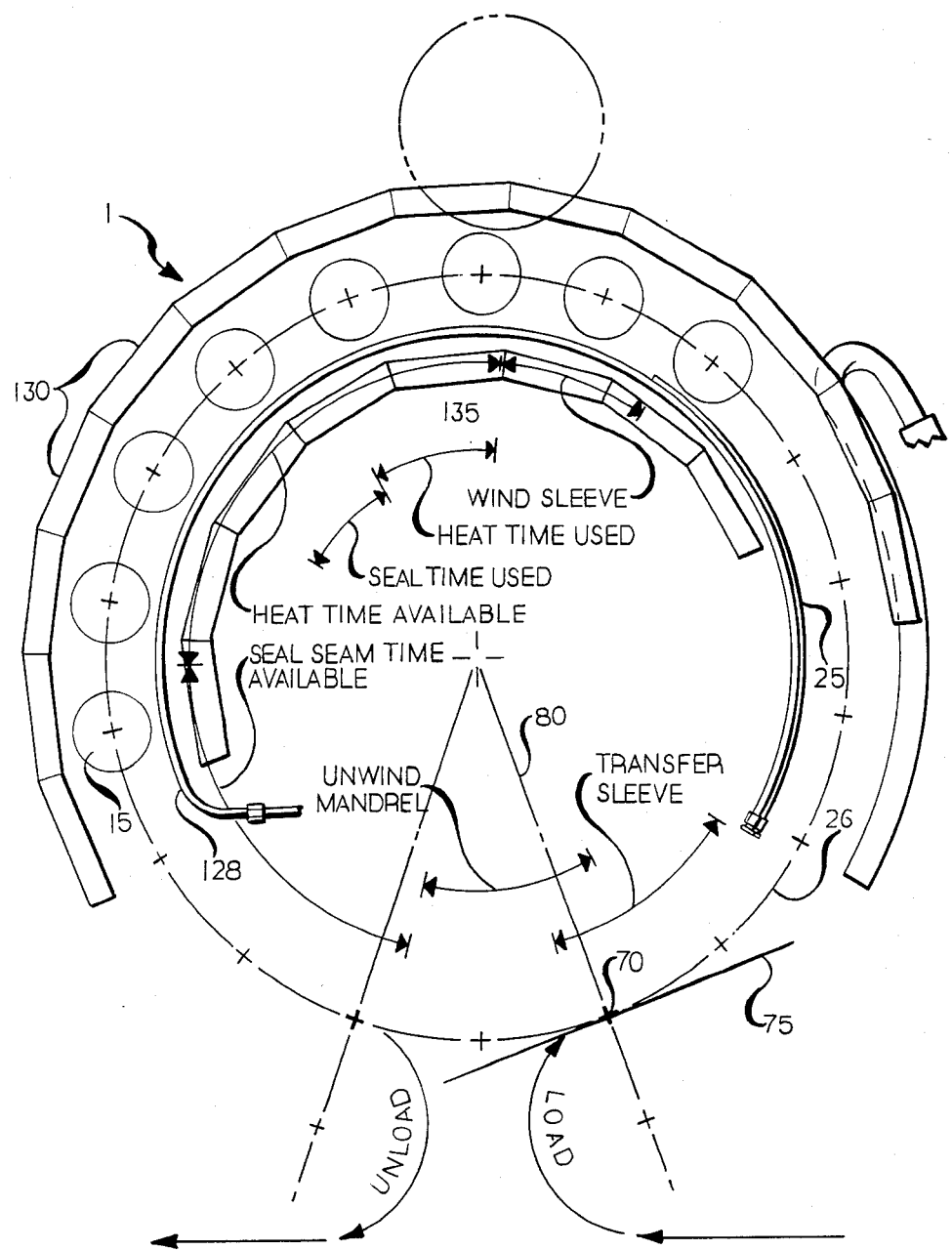
FIG. 1 is a schematic plan view of a compact machine of the present invention showing the upper portion of an 18 station turret and illustrating the very short arc of travel on the turret periphery needed to engage, control and start the forming of the oriented plastic sleeve around the container and heat-shrinking the same around the container.

The present invention provides a compact, inexpensive, easy to build, easy to maintain machine for putting heat-shrinkable oriented plastic sleeves on containers, the machine comprising a turret having an upper portion and a lower portion, there being means for transporting containers around the periphery of the upper turret portion preferably including a rope drive so constructed and arranged that the rope contacts the upper portion of the container and holds and rotates each of the containers as the container is transported around the turret periphery, the lower turret portion including means for transporting tubular sleeves of heat-shrinkable plastic around the turret periphery, and means for bringing a sleeve from the bottom of each of the containers up and around the container to form a sleeve thereon, there being means to feed a length of sleeve label material to the lower portion of the turret to form the sleeve, the label length being cut and overlapped slightly to form a seam on the sleeve, there being heating means to heat the seam as it is being formed, and there being pressing means to press the newly formed heated seam, the pressing means being so constructed and arranged that a pressing bar contacts the seam substantially the full length thereof, the pressing action of the bar being timed by camming means.

The present invention also provides an efficient, high production method of placing and heating heat-shrinkable oriented plastic sleeves on containers, the method comprising: (a) supplying containers in an upright position for travel around a turret periphery; (b) engaging the neck of each container with a rope to hold and rotate each container as it travels around the turret periphery; (c) forming the sleeve around the container as it travels around the turret periphery; and (d) heating the sleeve to heat-shrink it around the container.

The present invention provides a compact machine that takes control of the container very quickly as it is fed into the upper turret, the machine including means for transporting containers around the upper turret portion periphery, means for feeding containers into the peripheral path of the upper turret portion including a starwheel, means for grasping and controlling a container by capturing the container on a point of a horizontal line tangent to the upper portion periphery, the point being in a common line running through the center of the turret, the center of the starwheel, and the center of the container.

As seen in the drawings, the present invention relates to a compact machine 1 for placing and heat-shrinking oriented heat-shrinkable plastic tubular sleeves 10 on containers 15 such as glass bottles and biaxially oriented plastic bottles including oriented polyethylene terephthalate carbonated beverage bottles ranging generally in a size from about ½ liter to 2 liters.

The machine 1 comprises a turret 20 having an upper portion 25 having an upper turret periphery 26 and a lower turret portion 30, there being transporting means 32 for transporting containers around the periphery 26, the transporting means including a rope 40 that contacts the neck of the container and holds and rotates the container as it travels around the turret periphery 26.

Figure 9:
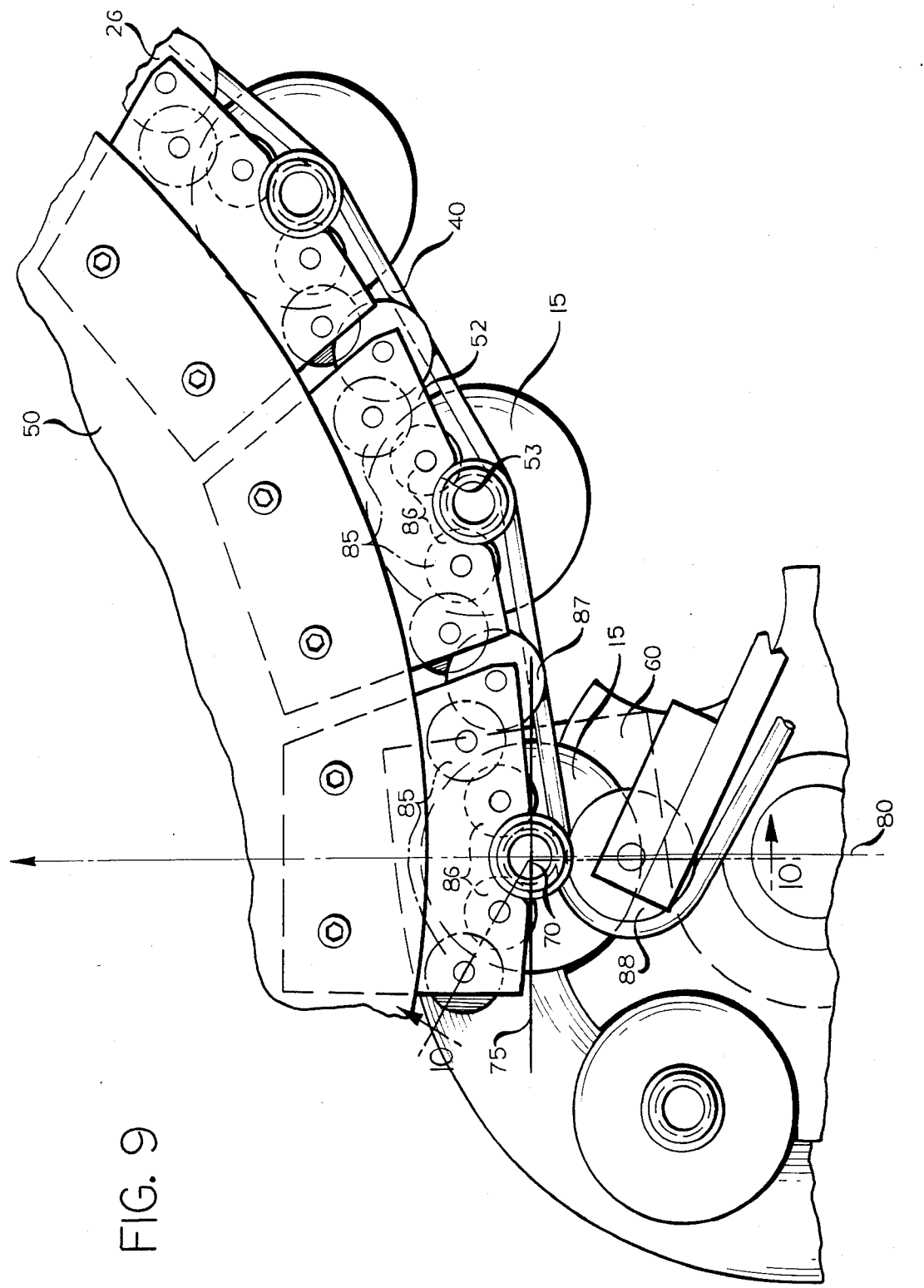
FIG. 9 is a fragmentary top plan view, on an enlarged scale, of the upper turret portion showing the engaging and capturing of the container at a point on the tangent to the upper turret.

The turret is rotated by a bull gear 45 that rotates a main vertical shaft 47, there being a lower gear 48, an upper gear 49 and a large horizontal top upper drive disc 50 that rotates in the upper turret portion. The upper gear 49, rigidly attached to shaft 47, drives the upper assembly of the upper turret portion, including shafts 49b that drive and rotate in in-feed and out-feed starwheel means in timed relationship to the rotation of the upper turret portion. The lower gear 48 is near the bottom of the lower turret portion and carries the frame and means for applying a plastic sleeve to each container as the container travels around, the turret periphery. A plurality of plates 52 with a recess 53 (as seen in FIG. 9) are rigidly connected to the outer annular peripheral edges of the disc, the outer edges of the plate defining the recesses 53 that define the upper turret periphery 26.

Figure 2:
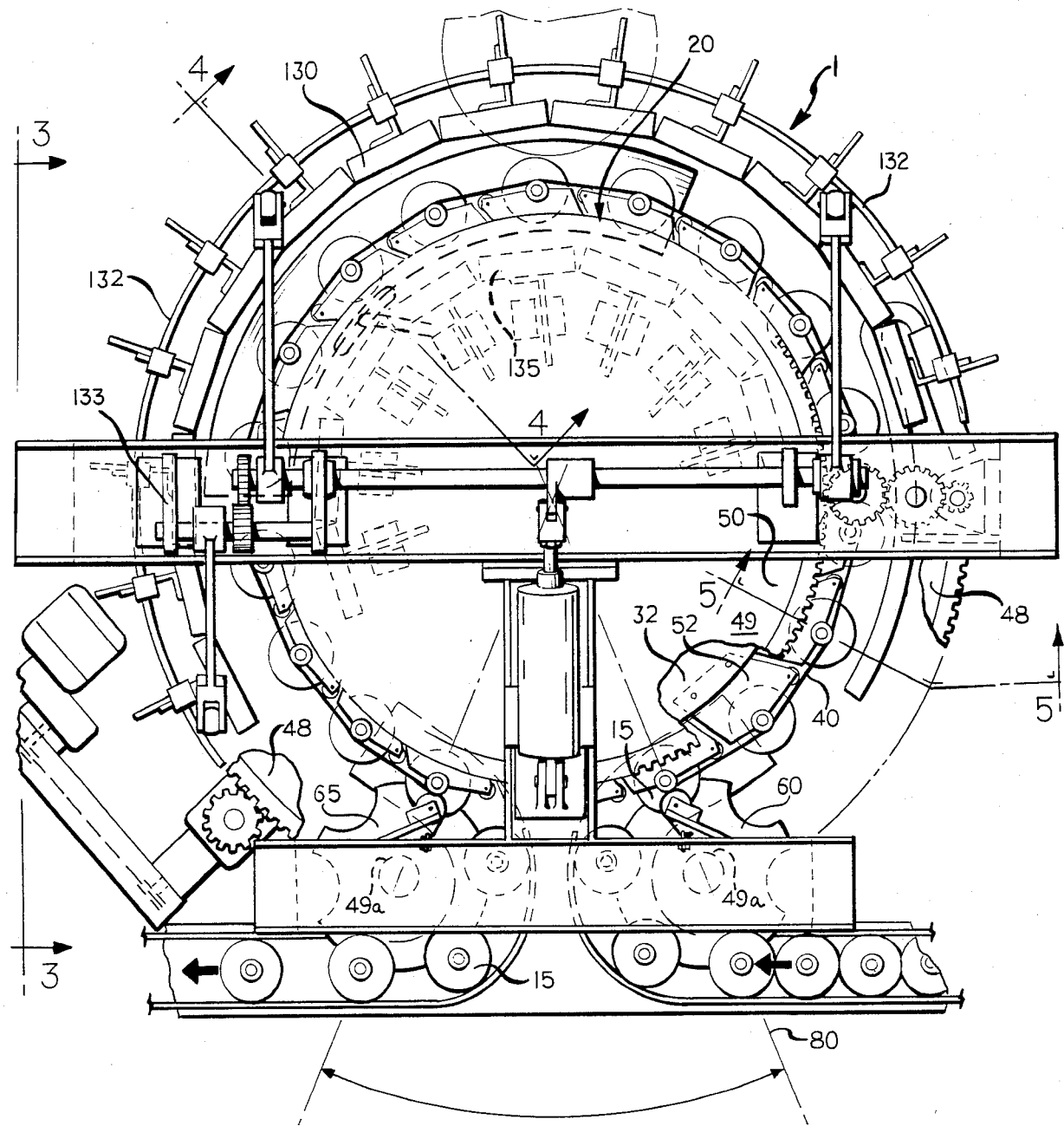
FIG. 2 is a top plan view of the upper portion of the compact turret of FIG. 1 showing details of the upper turret construction, the starwheel in-feed and the starwheel out-feed.
Figure 3:
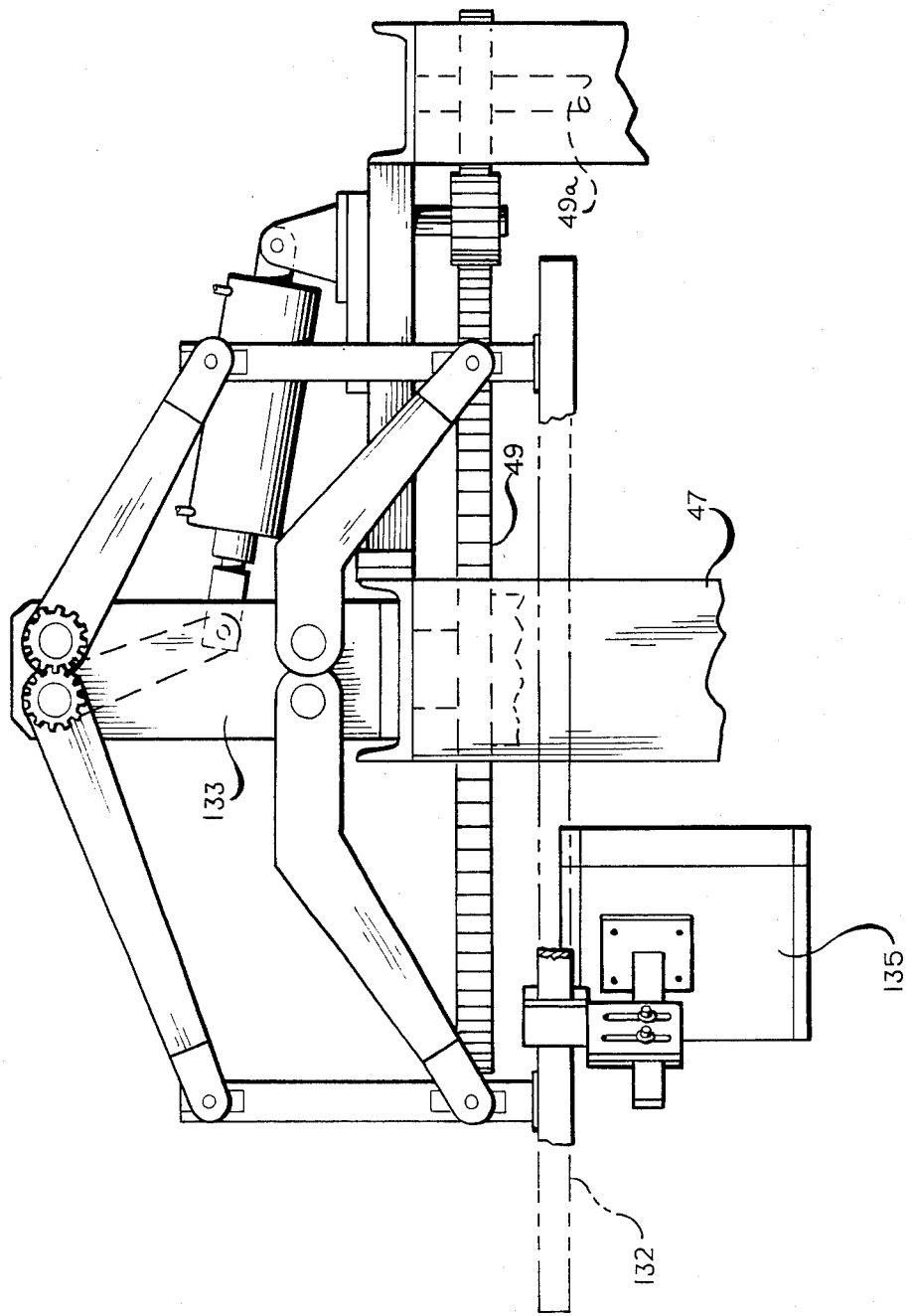
FIG. 3 is a sectional elevational view of portions of the upper turret taken along the lines indicated at 3—3 in FIG. 2.
Figure 4:
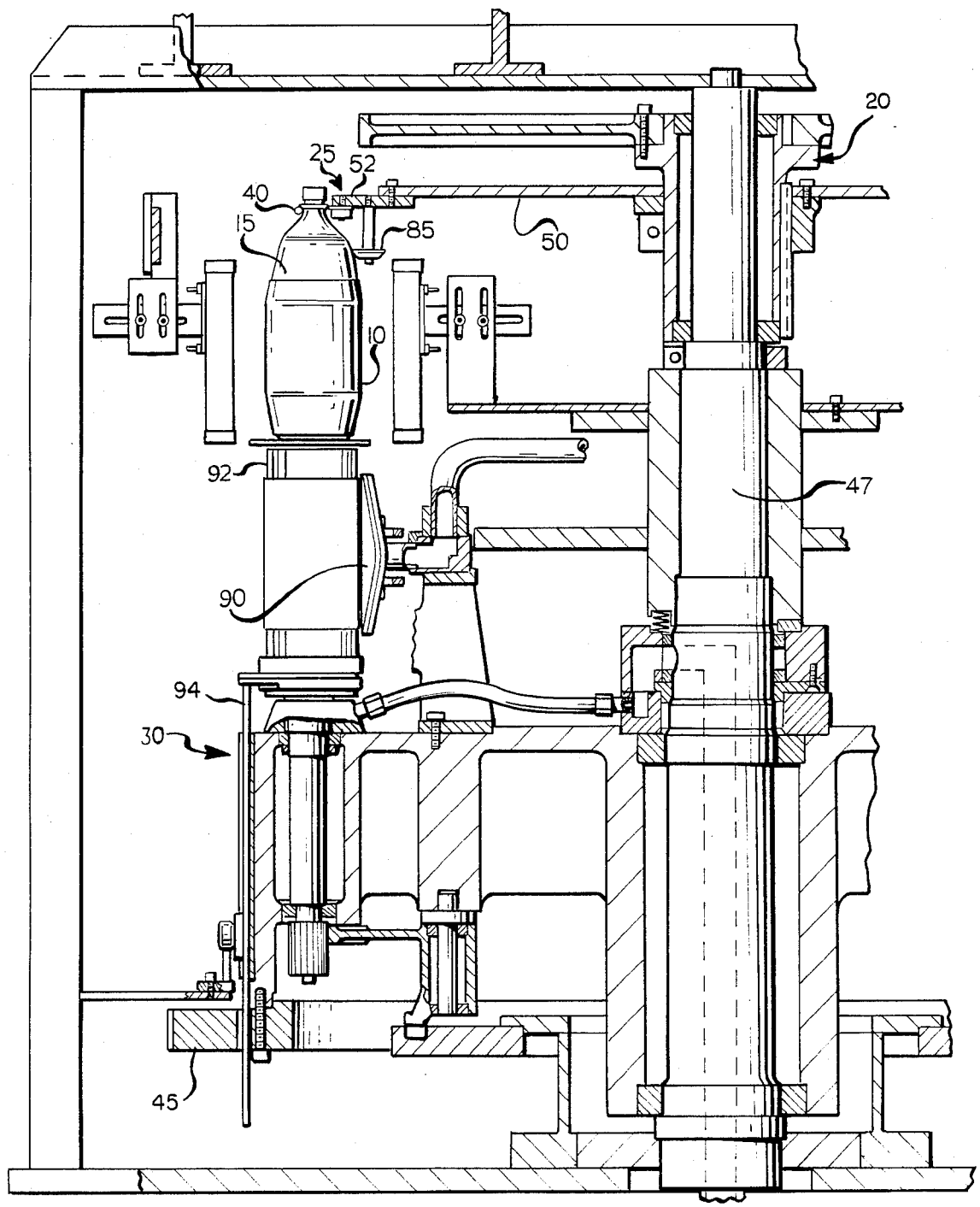
FIG. 4 is a side elevational sectional view of the compact machine showing the container in position to receive a tubular sleeve from underneath, the view being taken along the line 4—4 in FIG. 2.
Figure 5:
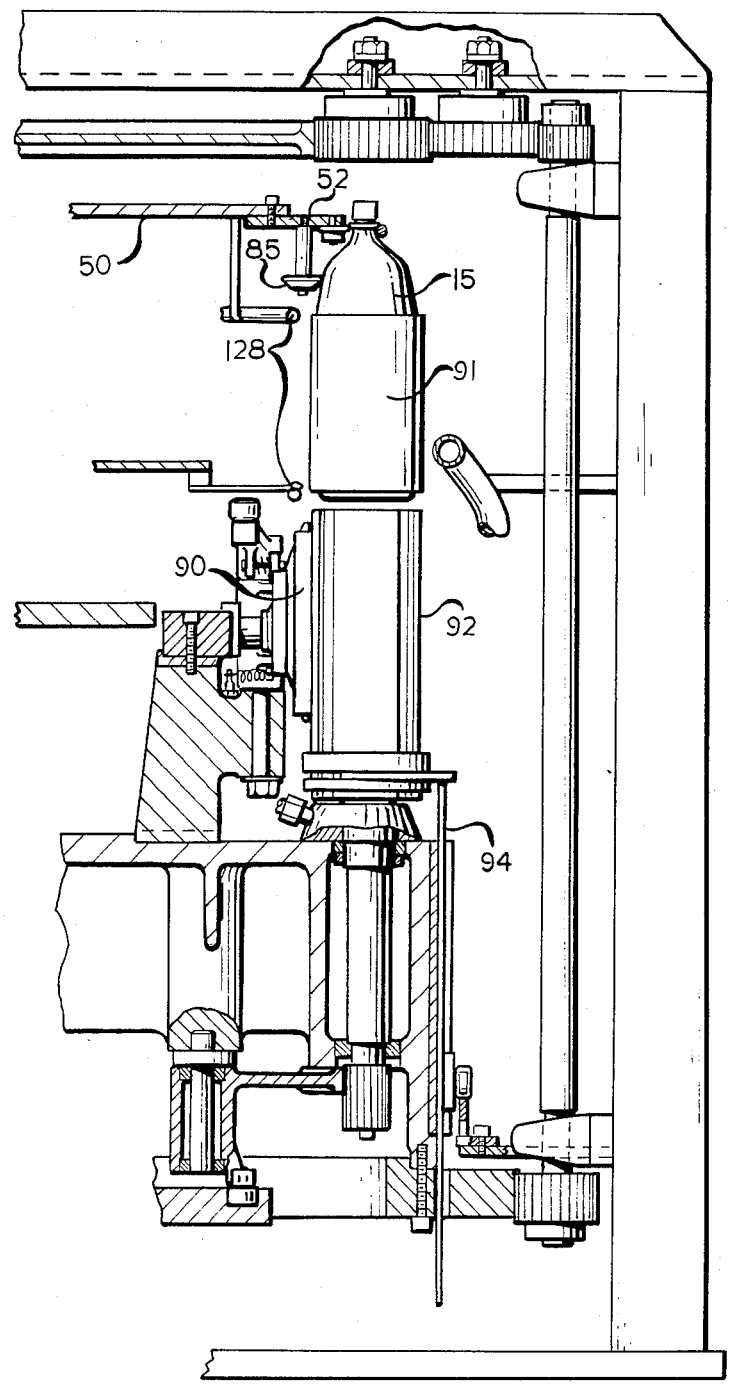
FIG. 5 is a side elevational sectional view showing the container with the sleeve thereon, the view being taken along the line 5—5 in FIG. 2.

As seen for instance in FIG. 2, there is provided an in-feed starwheel 60 and out-feed starwheel 65. Each of the containers 15, as it is fed into the upper turret periphery is grasped and controlled after only a very short arc of travel on the turret periphery. The container is received and controlled at a point 70 that is in a horizontal line 75 that is tangent to the upper turret periphery. The point 70 is also on a common line running through the center line of the turret, the center line of the starwheel 60, and the center line of the container 15. At point 70, the container is already in a position to start the sleeve operation thus saving much time for other operations on the travel of the containers around the turret periphery.

Each container, when it reaches point 70 is within the receiving recess 53 of the plate 52, the rope 40 engaging the upper portion of the container to transport and rotate the container around the turret periphery. Each of the containers is held in a generally upright vertical position by the rope and a pair of idler rollers 85 that contact the middle portion of the container and travel around the periphery therewith.

Figure 10:
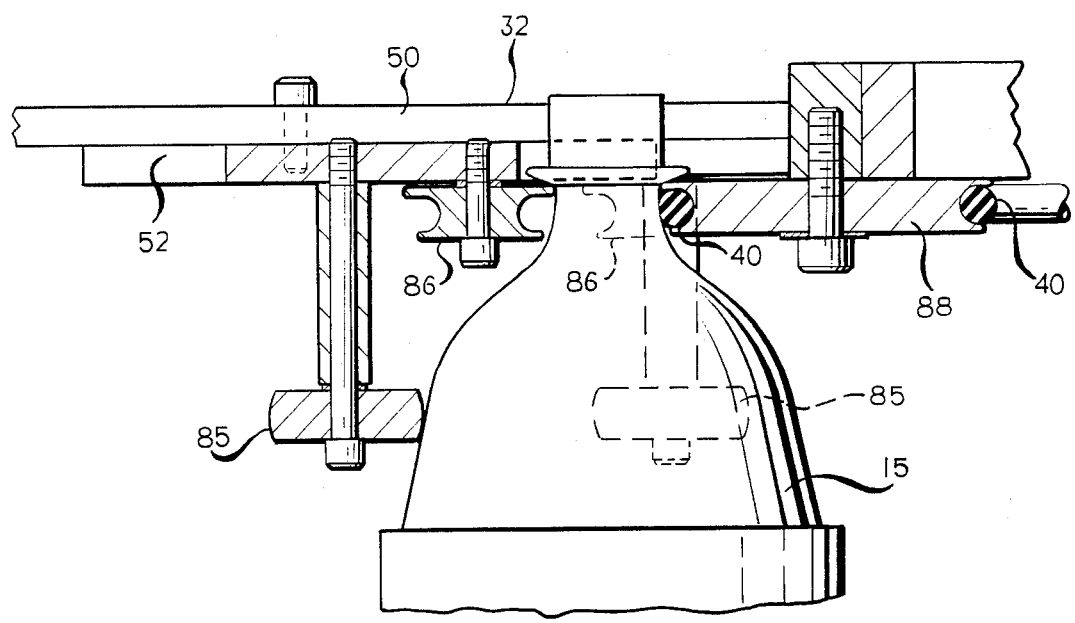
FIG. 10 is an elevational sectional fragmentary view taken along the line 10—10 in FIG. 9.
Figure 11:
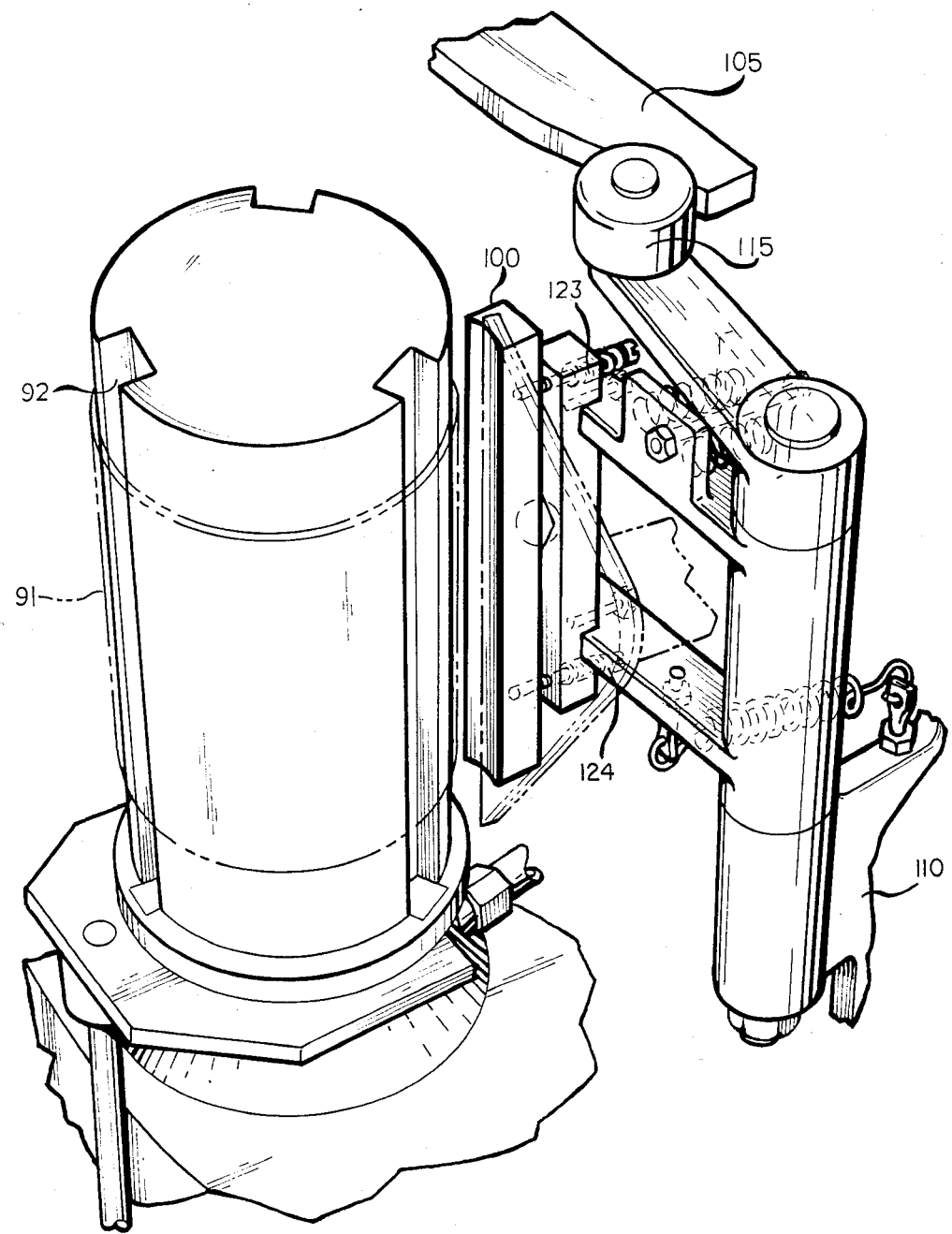
FIG. 11 is a perspective view of the pressing means for the heated seam of the sleeve.
Figure 12:
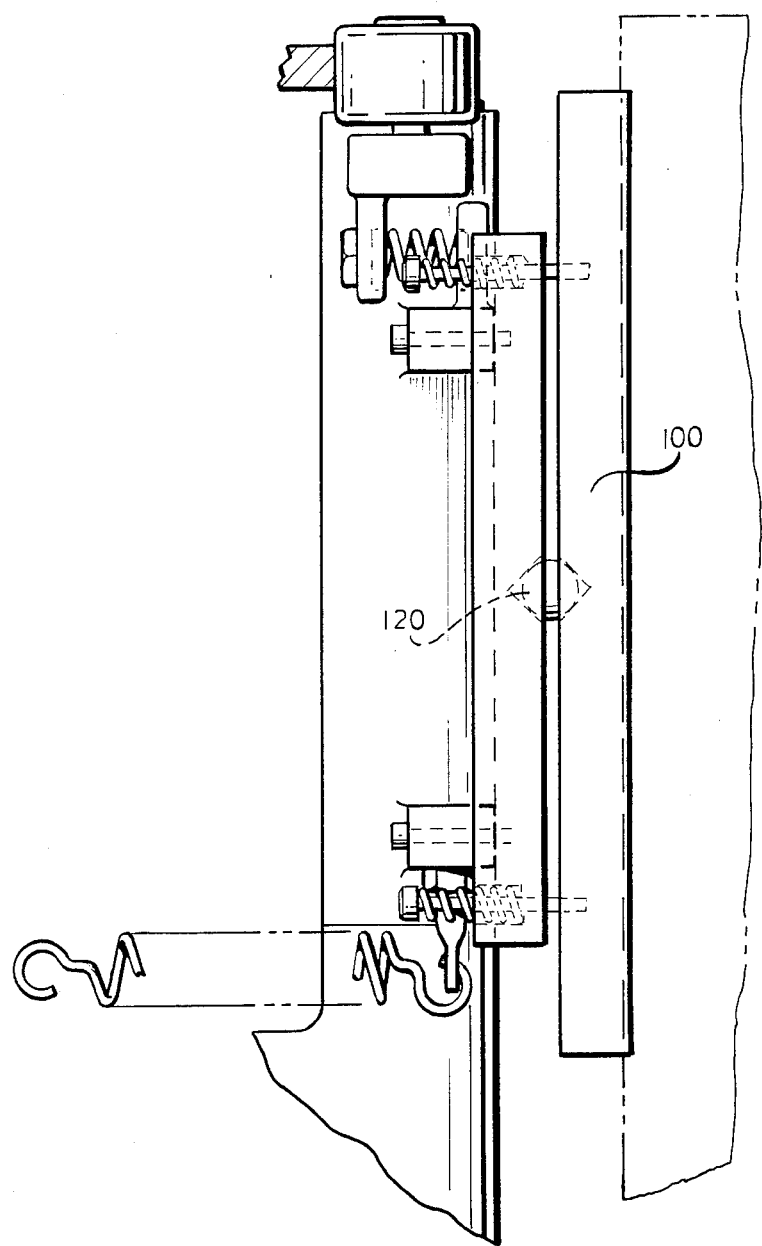
FIG. 12 is a fragmentary sectional elevational view, on an enlarged scale, taken along the line 12—12 in FIG. 8.

The plate 52 carries rigidly connected thereto a pair of rollers 86 and each plate carries a pulley wheel 87. Each pulley wheel 87 contacts and engages the rope 40 as the plates and attached pulley wheels 87 are driven around the turret periphery. As seen in FIGS. 9 and 10, the rope 40 is contacted by a large pulley wheel 88 disposed between the point of tangency 70 and the starwheel 60.

The function of the lower turret in supplying the oriented plastic sleeves in timed relationship to the containers is old in the art, as for instance, seen in U.S. Pat. No. 3,959,065 to Ashcroft (assigned to Owens-Illinois, Inc.) and this patent is incorporated by reference particularly to show the operation of the lower turret and the assembly of the shrinkable plastic telescopically onto the container. As is known in the art, there is provided a means 90 for forming the sleeve 10 around each of the containers 15 from a length 91 of plastic sheet material loosely formed into a tubular shape. There are means on the lower turret portion for accomplishing this including a mandrel 92 and means 94 to push the sleeve up from the mandrel to a position around the lower portion of the container.

Figure 6:
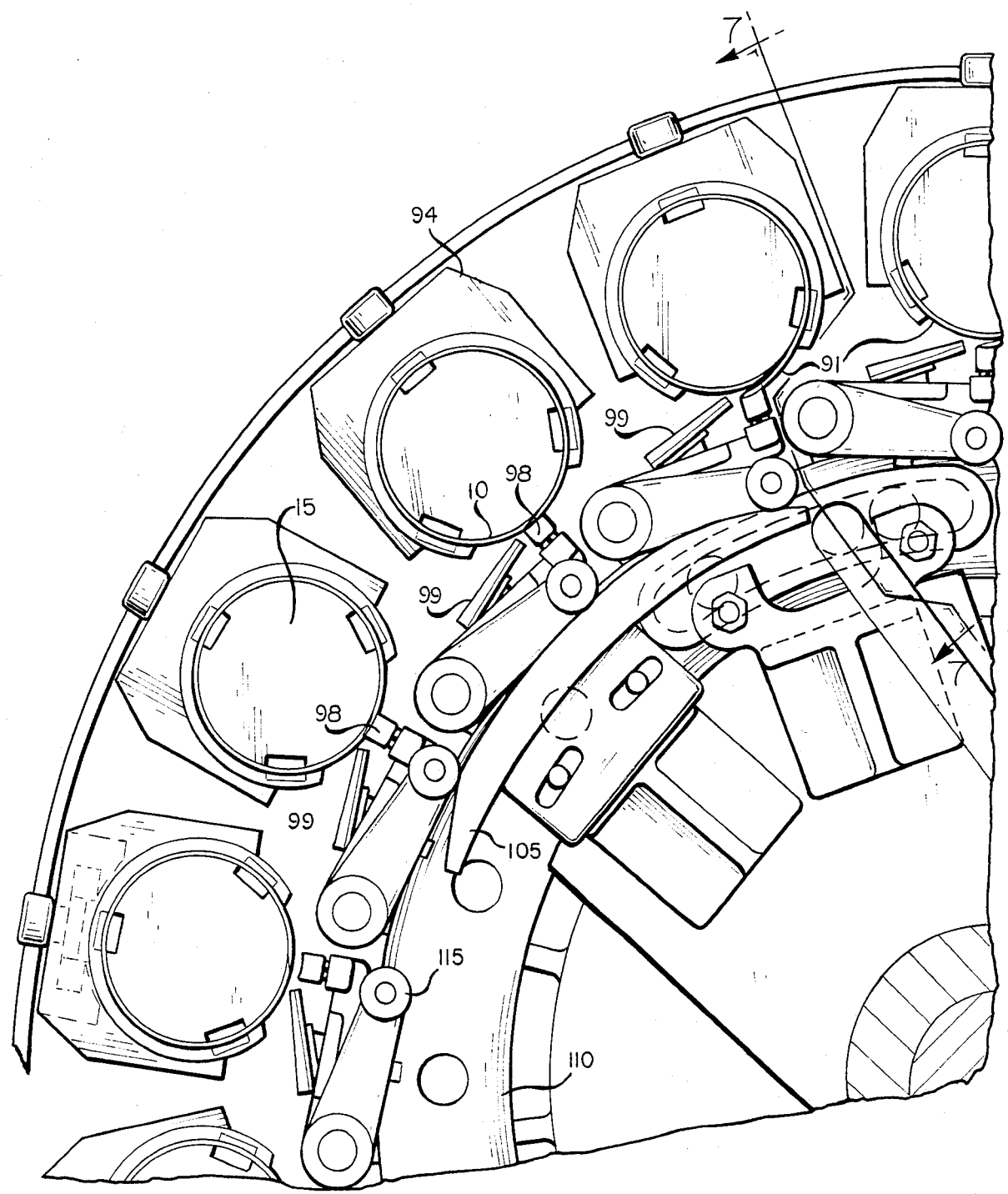
FIG. 6 is a top plan view of a portion of the upper turret showing the means for heating and pressing the heated seam of the plastic sleeve on the container.
Figure 7:
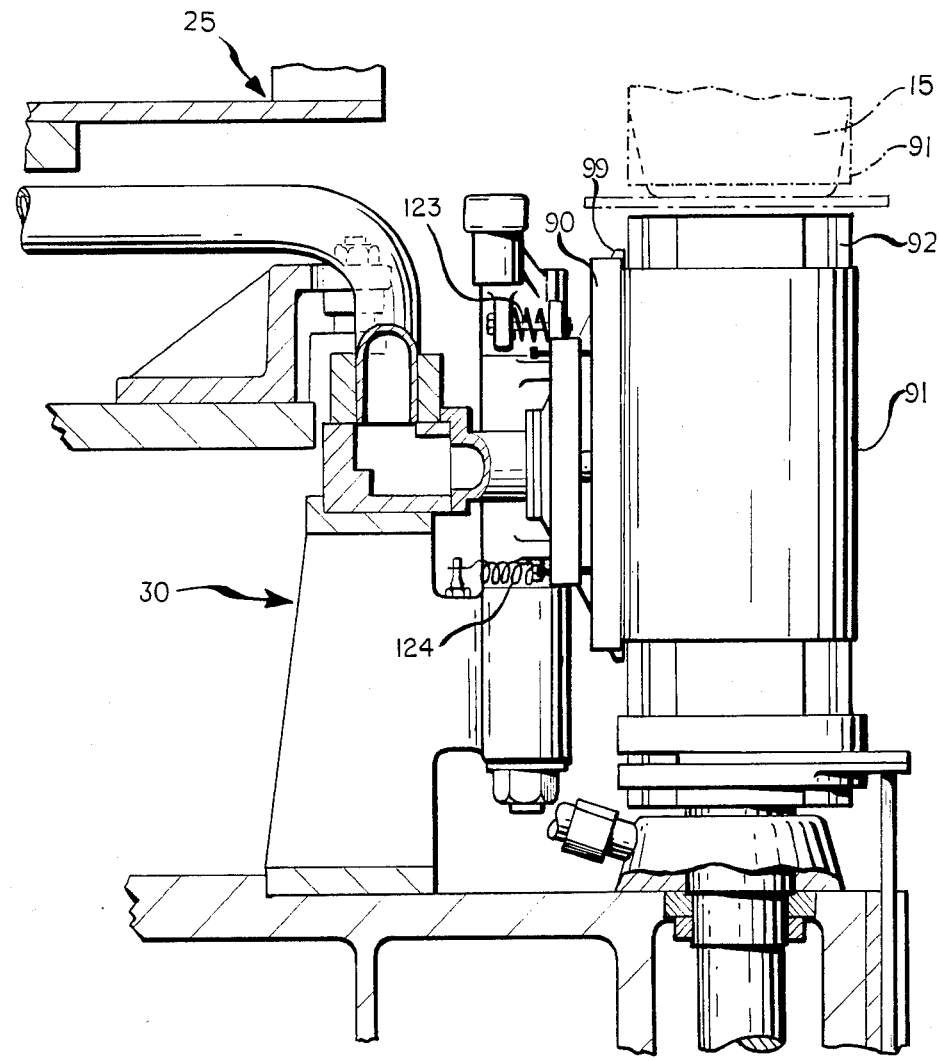
FIG. 7 is a side elevational sectional view taken along the line 7—7 in FIG. 6.
Figure 8:
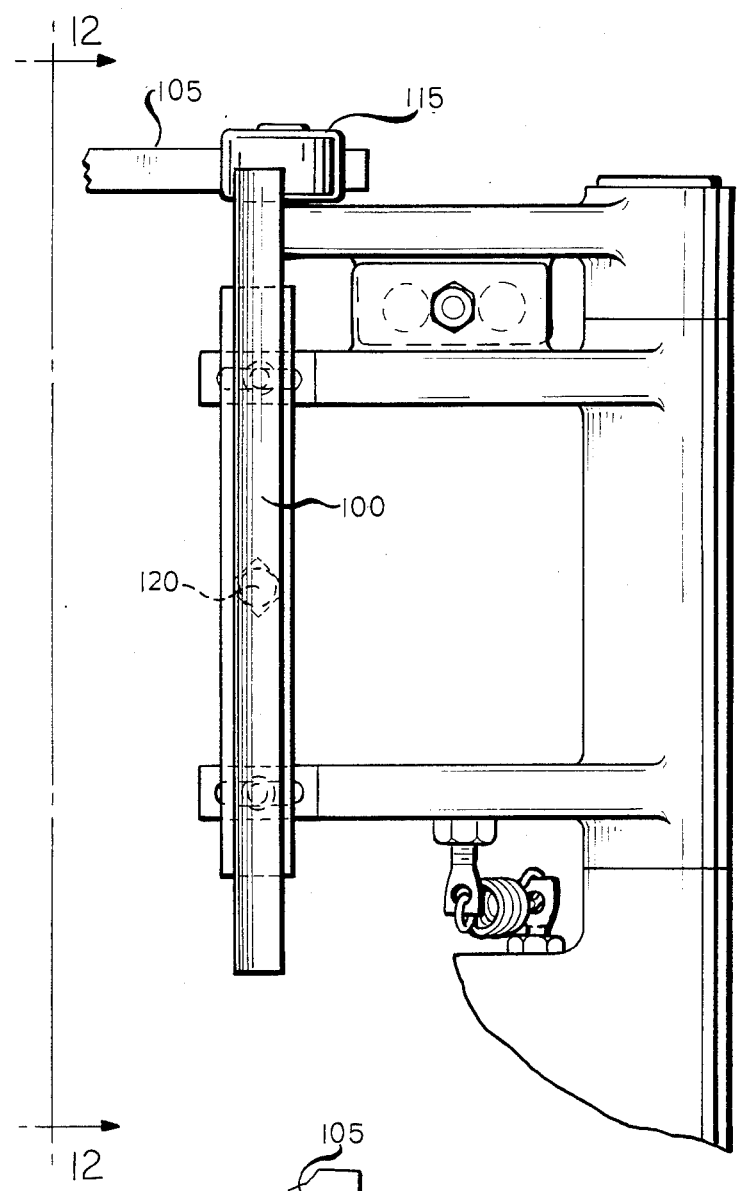
FIG. 8 shows a side elevational view on an enlarged scale of the pressing means for pressing the heated sleeve seam as the sleeve and container are transported around the lower turret periphery and the upper turret periphery, respectively.
Figure 13:
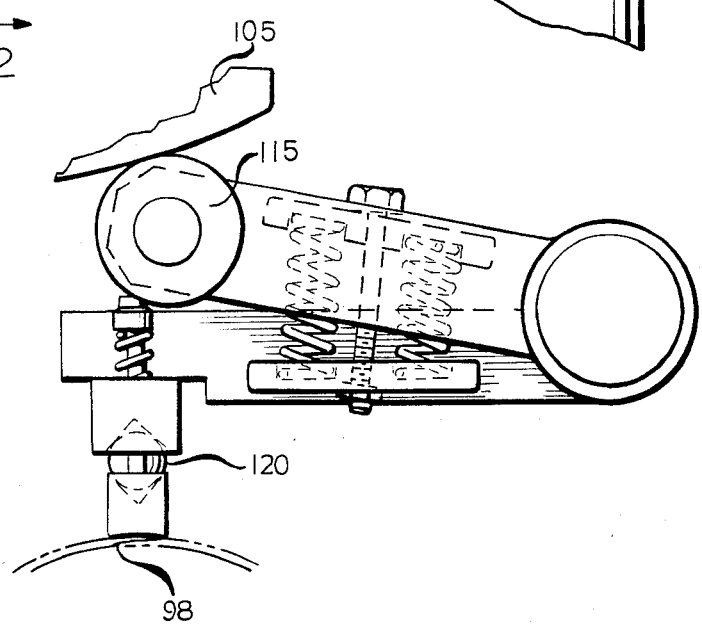
FIG. 13 is a top plan view, taken on an enlarged scale, of the hot seam pressing means and the timing means therefor including cam means.

A seam 98 is formed on each sleeve to provide the tubular configuration, the seam being formed by novel means including pressing means including a hot air nozzle 99 and a novel pressing bar 100 that presses the heat seam substantially throughout its length as the seam is formed on the mandrel 92. The pressing action of the bar 100 is timed by camming means including a cam 105. The pressing bar 100 is carried on a frame 110 having a roller 115. As for instance seen in FIG. 6, the pressing bar is out of engagement with the newly formed seam and is urged toward the seam and into contact therewith when the roller 115 goes over cam 105. The pressing bar means is free floating and self-aligning, there being a sphere 120 in a ball joint in the middle of the bar and springs 123 and 124 near each end of the bar to urge the bar into self-aligned contact with the heated seam. The contact with the seam is one of full pressure evenly applied along the length of the pressing bar.

There is provided heating means 99 in the form of a hot air nozzle to heat the seam for the pressing operation. The nozzle has a series of holes in the generally upright pipe to conveniently supply the heat to the seam.

Means for heating the oriented plastic sleeves to heat-shrink the same around the containers are provided, in the embodiment shown, in the form of a heat pipe 128 that is disposed interiorly of the upper turret periphery and is generally concentric therewith for a portion of the turret periphery where the seam is made and the final shrinking of the sleeve performed. The heat pipe 128 is located near the bottom of the containers and concentric to the path of the containers. The pipe 128 has a plurality of holes whereby heat is directed toward the sleeves during the heat-shrinking operation. Heat-shrinking can also be accomplished with a series of infrared heating panels 130, as for instance seen in FIG. 1, mounted on a lift ring 132 for convenient movement of the panels out of the way for repairs, etc., by lifting means 133. Infrared panels 135 can also be disposed radially inwardly of the turret periphery and can be constructed for lifting up out of the way for maintenance work, etc.

In the embodiment shown, the rope 40 is tied down on each end of the upper turret frame near the in-feed starwheel and the out-feed starwheel. The containers are rotated by the rotation of the turret plates, rollers and pulley wheels 87 by the friction thereof against the rope which is preferably a tough, wear resistant, rubbery silicone polymer. The rope also can be rotated around the turret periphery as, for instance, in the form of an endless belt driven by a variable speed motor which can be driven in either direction and also adjusted to change the rate of rotation of the containers and to change the speed of the travel of the containers around the turret periphery.

What is claimed is:

1. A machine for putting heat-shrinkable oriented plastic sleeves on containers, the machine comprising a turret having an upper portion and a lower portion, there being means for transporting containers around the periphery of the upper turret portion including a rope drive so constructed and arranged that a rope contacts the upper portion of the container and holds and simultaneously rotates each of the containers as the container is transported around the turret periphery, the lower turret portion including means for transporting tubular sleeves of heat-shrinkable plastic around the turret periphery, and means for bringing a sleeve from the bottom of each of the containers up and around the container to form a sleeve thereon.

2. A machine as defined in claim 1 in which the rope is stationary and the rotation of the upper turret portions pushes the container against the rope to rotate the container as it moves about the periphery.

3. A machine as defined in claim 2 in which the rotating bottles are held in an upright position by the rope and a pair of rollers that travel around the periphery with each bottle.

4. A machine as defined in claim 1 in which the containers are fed into the machine by a starwheel whereby each container is engaged by the rope and each container is ready for the sleeve operation at the point of tangency on the turret periphery.

5. A machine for putting heat-shrinkable oriented plastic sleeves on containers, the machine comprising a turret having an upper portion and a lower portion, there being means for transporting containers around the periphery of the upper turret portion including a rope drive so constructed and arranged that the rope contacts the upper portion of the container and holds and rotates each of the containers as the container is transported around the turret periphery, the lower turret portion including means for transporting tubular sleeves of heat-shrinkable plastic around the turret periphery, and means for bringing a sleeve from the bottom of each of the containers up and around the container to form a sleeve thereon, there being means to feed a length of sleeve label material to the lower portion of the turret to form the sleeve, the label length being cut and overlapped slightly to form a seam on the sleeve, there being heating means to heat the seam as it is being formed, and there being pressing means to press the newly formed heated seam, the pressing means being so constructed and arranged that a pressing bar contacts the seam substantially the full length thereof, the pressing action of the bar being timed by camming means.

6. A machine for placing and heat-shrinking oriented heat-shrinkable plastic sleeves on containers, the machine comprising a turret having an upper portion and a lower portion, means for transporting containers around the upper turret portion periphery, means for feeding containers into the peripheral path of the upper turret portion including a starwheel, means for grasping and controlling a container by capturing the container on a point of a horizontal line tangent to the upper portion periphery, the point also being in a common horizontal line running through the center of the turret, the center of the starwheel, and the center of the container.

7. A machine as defined in claim 6 in which a plurality of bottle engaging plates are carried around the turret periphery each plate having an outer edge portion defining a recess to receive the upper portion of the container, the recess of the plate being aligned with the center of the container and the center lines of the turret and starwheel when the center of the container reaches the point of tangency on the turret periphery.

8. A machine as defined in claim 7 in which each of the plates is connected to a driven disc that revolves around the center line of the turret.

9. A machine for placing and heat-shrinking oriented plastic sleeves on containers, the machine comprising a turret with upper and lower portions, means to rotate the turret including an upper driven disc having an annular outer edge portion with a plurality of plates having outer recesses that define the periphery of the upper turret, holding means for holding containers in place on the turret periphery, the holding means so constructed and arranged that each container that is fed to the turret periphery is held and rotated around the periphery, the container being held securely as it travels to the periphery at a tangent point.

10. A machine for putting heat-shrinkable oriented plastic sleeves on containers, the machine comprising a turret having an upper portion and a lower portion, there being means for transporting containers around the periphery of the upper turret portion that the means contacts the upper portion of the container and holds and simultaneously rotates each of the containers as the container is transported around the turret periphery, the lower turret portion including means for transporting tubular sleeves of heat-shrinkable plastic around the turret periphery, and means for bringing a sleeve from the bottom of each of the containers up and around the container to form a sleeve thereon, there being means to feed a length of sleeve label material to the lower portion of the turret to form the sleeve, the label length being cut and overlapped slightly to form a seam on the sleeve, there being heating means to heat the seam as it is being formed, and there being pressing means to press the newly formed heated seam, the pressing means being so constructed and arranged that a pressing bar contacts the seam substantially the full length thereof, the pressing action of the bar being timed by camming means.

11. A method of placing and heating heat-shrinkable oriented plastic sleeves on containers, the method comprising A. supplying containers in an upright position for travel around a turret periphery;
B. engaging the neck of each container with a rope to hold and rotate each container as it travels around the turret periphery;
C. forming the sleeve around the container as it travels around the turret periphery; and
D. heating the sleeve to heat-shrink it around the container.

12. A method as defined in claim 5 in which there is included the step of controlling the rate of rotation of each container and the rate that each of the containers passes a selected point on the turret periphery.

13. A method as defined in claim 11 in which the engaging of the neck of each of the containers as each container reaches the turret periphery is done at a point on the turret periphery that is on a line tangent to the periphery, the point also being on a common horizontal center line running through the centerline of the turret and the center line of the container.

* * * * *